United States Patent
Kurato et al.

[11] Patent Number: 5,122,419
[45] Date of Patent: Jun. 16, 1992

[54] PLASTIC BODY

[75] Inventors: Hirofumi Kurato; Chitaka Akutagawa; Masahito Suzuki, all of Iwata, Japan

[73] Assignee: Yamaha Hatsudoki Kabushiki Kaisha, Iwata, Japan

[21] Appl. No.: 525,119

[22] Filed: May 17, 1990

[30] Foreign Application Priority Data

May 19, 1989 [JP] Japan .................................. 1-126308

[51] Int. Cl.⁵ ............................................. B32B 27/38
[52] U.S. Cl. .................................... 428/413; 244/133; 296/39.3; 296/901; 428/474.9; 428/495; 428/512; 428/521; 428/920
[58] Field of Search ............... 428/519, 521, 474.9, 428/413, 495, 920; 244/133, 117 A, 158 A; 296/39.3, 901

[56] References Cited

U.S. PATENT DOCUMENTS

| | | | |
|---|---|---|---|
| 3,259,516 | 7/1966 | Dempsey et al. | 244/117 A |
| 3,268,359 | 8/1966 | Boyd | 244/133 |
| 4,123,575 | 10/1978 | Wesch et al. | 427/386 |
| 4,300,970 | 11/1981 | Honda et al. | 428/495 |
| 4,438,171 | 3/1984 | Wefer | 428/215 |
| 4,501,841 | 2/1985 | Herring | 524/411 |
| 4,551,392 | 11/1985 | Draexler | 428/495 |
| 4,710,408 | 12/1987 | Kraus | 427/393.5 |
| 4,935,290 | 6/1990 | de Rancourt et al. | 428/519 |

Primary Examiner—Merrell C. Cashion, Jr.
Assistant Examiner—D. S. Nakarani
Attorney, Agent, or Firm—Ernest A. Beutler

[57] ABSTRACT

A body that is adapted to contain a heat source such as a watercraft propelled by an internal combustion engine that is formed from heat sensitive polydicyclopentadiene. In order to protect the polydicyclopentadiene from deterioration due to oxidation caused by the heat, an insulating and protective layer selected from the groups of synthetic resins or synthetic rubbers is placed upon the polydicyclopentadiene at least adjacent the heat source. A preferred coating of epoxy resin is disclosed.

16 Claims, 1 Drawing Sheet

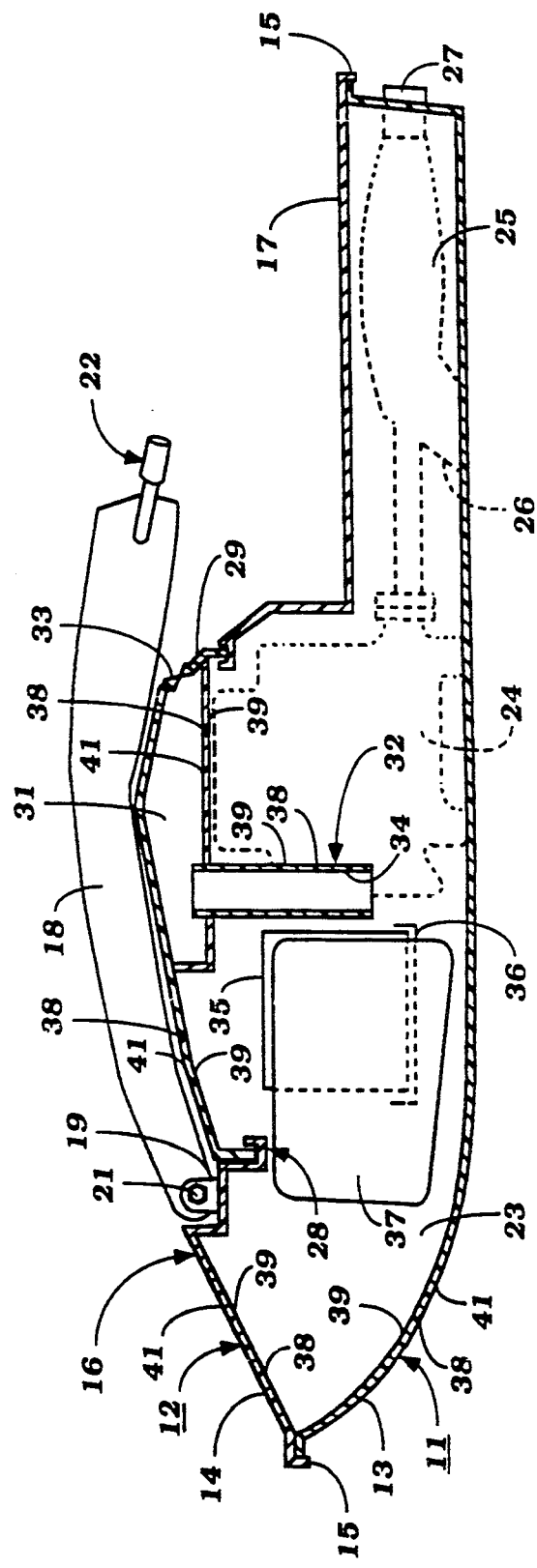
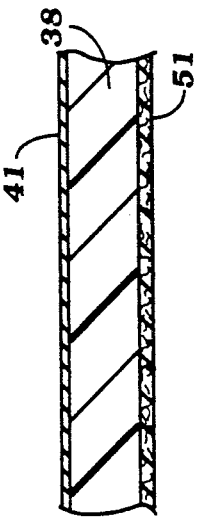
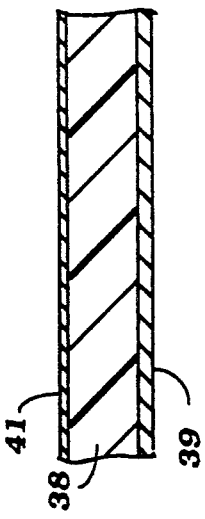

PLASTIC BODY

BACKGROUND OF THE INVENTION

This invention relates to a plastic body and more particularly to an improved plastic body made of polydicyclopentadiene and which is adapted to be exposed to a heat source.

A wide variety of bodies are made from a material consisting of a fiber reinforced plastic such as fiberglass. These bodies are employed for such uses as watercraft, motor vehicle bodies or bodies for units such as air conditioners or the like. Although fiber reinforced plastics are popular materials, they have the disadvantage of being quite heavy in weight and also are not as strong per unit weight as might be desired. A suitable substitute material, but for a quality hereinafter described, would be the plastic polydicyclopentadiene because of its strength and lightness. However, many of these bodies and applications as aforenoted place the body in close proximity to a high heat source such as an internal combustion engine, an electric motor, a compressor or the like. The disadvantage with polydicyclopentadiene is that it deteriorates because of oxidation particularly at high temperatures. Also, this material is attacked by gasoline.

If it is attempted to insulate the polydicyclopentadiene from the oxygen heat and other foreign materials that may attack it, then the body becomes heavy again. In addition, it may be difficult to provide adequate protection or it may be difficult to insure that the protection layer will adhere properly and provide the necessary protection.

It is, therefore, a principal object of this invention to provide an improved body made of polydicyclopentadiene which is protected from oxygen heat and foreign materials in such a way as to not add significantly to its weight.

It is a further object of this invention to provide an improved protective coating for a polydicyclopentadiene body.

SUMMARY OF THE INVENTION

This invention is adapted to be embodied in a body made of polydicyclopentadiene which body is disposed, at least in part, adjacent a heat source. In accordance with the invention, the polydicyclopentadiene is coated with a material formed from either a synthetic resin or a rubber on the surface that faces the heat source to protect it.

BRIEF DESCRIPTION OF THE DRAWINGS

FIG. 1 is a cross sectional view taken through a small watercraft having a plastic body constructed in accordance with an embodiment of the invention.

FIG. 2 is an enlarged cross sectional view of a portion of the body adjacent the engine.

FIG. 3 is a cross sectional view, in part similar to FIG. 2, and shows another embodiment of the invention.

DETAILED DESCRIPTION OF THE PREFERRED EMBODIMENTS OF THE INVENTION

Referring first to FIG. 1, a small watercraft of the jet propelled type designed to be operated by a single rider standing or seated upon it is indicated generally by the reference numeral 11. Although the invention is described with such a watercraft because of the particular utility of the invention in connection with such vehicles, the invention may be utilized with a wide variety of other applications where vehicles are formed with plastic bodies, such as other types of watercraft, larger ships, snowmobiles and other types of devices such as air conditioners or the like that contain a source of high heat.

The watercraft 11 is comprised of a hull, indicated generally by the reference numeral 12 and formed primarily from a body made of polydicyclopentadiene. In the illustrated embodiment, this hull is made of a lower hull portion 13 and an upper hull portion 14 that are affixed to each other by an interlocking joint 15 formed by a peripheral flange that may be adhesively or sonically welding or otherwise connected.

The hull 12 is generally hollow in configuration and defines a forward bow portion 16 and a rearward generally planar rider's area 17. A mast 18 is pivotally connected to the forward end to the bow 16 by means of a supporting bracket 19 and pivot bolt 21. The mast 18 carries a handlebar 22 for steering and operation of the watercraft either kneeling, sitting or standing on the rider's area 17.

The bow 14 defines an engine compartment 23 that is disposed forwardly of the rider's area 17 and which contains an internal combustion engine 24 of any known type. The engine 24 is supported by a suitable engine mount on the hull 12 and has its output shaft coupled to the drive shaft of a jet propulsion unit, indicated generally by the reference numeral 25. The jet propulsion unit 25 has a downwardly facing water inlet portion 26 that draws water from the body in which the watercraft 11 is operating. This water is discharged through a discharge nozzle 27. The discharge nozzle 27 is pivotal about a vertically extending axis for steering of the watercraft by means of the handlebar 22 in a well known manner.

A hatch opening 28 is formed by a depressed flange extending around the main hull 12. A hatch cover, indicated generally by the reference numeral 29 closes this opening and is removable for access to the engine compartment 23 and the component 23 and the components therein, including the engine 24. The hatch cover 29 is provided with a hollow air portion 31 from which depends a vent pipe 32. An air inlet opening 33 is provided at the rear portion of the hatch cover 29 so that air can flow into the engine compartment 23 for ventilation through the hollow interior 34 of the vent pipe 32 and also so that fumes can be discharged from the engine compartment 23.

There are also provided further auxiliaries for the watercraft within the engine compartment 23. These may include a battery 35 that is supported above a battery tray 36 and a fuel tank 37. In addition, the engine 24 is provided with an exhaust system whereby exhaust gases and cooling water are discharged back to the body of water in which the watercraft is operating. All of these constructions may be considered to be well known in this art.

As has been noted, with conventional watercraft of this type, it has been the practice to form the hull 12 or at least the major components of it such as the hull halves 13 and 14 and the hatch cover 29 from a fiberglass reinforced resinous plastic material. The disadvantages of this material have already been discussed and will not be repeated herein. In accordance with the invention, these components of the watercraft including the vent tube 32 are formed from a polydicyclopentadiene plastic sheet 38 that is suitably molded to the desired shape. The parts of the sheet 38 facing the cavity 23 are coated with a protective coating 39 which is designed so as to provide protection against heat and oxidation for the polydicyclopentadiene 38 and also protect it against gasoline or other vapors that might tend to cause deterioration or oxidation. The coating 39 may be any of the known synthetic resins such as thermosetting resins such as epoxy, phenolic or urethane resins, or a thermoplastic resin such as nylon. Alternatively, rubber or synthetic rubber such as butadiene-acrylonitrile (NBR), ethylene-propylene (EPDM) or silicone rubber may be utilized for the coating 39. A particularly preferred material would be an epoxy resin because of the high bonding strength with polydicyclopentadiene, gasoline protection and thermal resistance. Also, it can be applied as a liquid and then will set in place and thus affords advantages from a manufacturing standpoint.

The exterior surface of the sheet material 38 is coated with a decorative coating such as a paint 41. The protective coating 39 is made thick enough so as to provide the requisite protection and insulating without adding significantly to the weight.

FIG. 3 shows another embodiment of the invention wherein a protective coating, indicated generally by the reference numeral 51 is adhered to the inner surface of the sheet 38. The coating 51 may be formed from a coating layer that includes a reinforcing fiber, for example glass fiber, and will add further strengthening to the construction.

In the illustrated embodiments, the protective coatings 39 and 41 have been applied to the entire interior surface of the hull portions 13, 14 and hatch 29. It is to be understood that the protective coating may, in some instances, only be applied to the portions of the hull wherein high heat and/or corrosive materials such as gasoline may be present. Also, although a number of embodiments of the invention have been illustrated and described, various changes and modifications may be made without departing from the spirit and scope of the invention as defined by the appended claims.

We claim:

1. A body for an article adapted to contain a source of high heat that will cause attack and deterioration of the material of the body which material comprises polydicyclopentadiene including a protective layer formed on said body of polydicyclopentadiene in proximity to the heat source and formed from a material selected from the group consisting of synthetic resins, synthetic rubbers and such materials including fiberglass reinforcing, said protective layer being of sufficient thickness to render the material of the body resistant to heat and oxidation without adding significantly to the weight.

2. A body as set forth in claim 1 wherein the protective layer is a thermosetting resin selected from the group consisting of epoxy, phenolic and urethane resins.

3. A body as set forth in claim 1 wherein the protective layer is a thermoplastic nylon resin.

4. A body as set forth in claim 1 wherein the protective layer is a synthetic rubber selected from the group consisting of butadiene-acrylonitrile, ethylene-propylene and silicone rubber.

5. A body as set forth in claim 1 wherein the body comprises a vehicle body and the heat source comprises an internal combustion engine.

6. A body as set forth in claim 5 wherein the protective layer is a thermosetting resin selected from the group consisting of epoxy, phenolic and urethane resins.

7. A body as set forth in claim 5 wherein the protective layer is a thermoplastic nylon resin.

8. A body as set forth in claim 5 wherein the protective layer is a synthetic rubber selected from the group consisting of butadiene-acrylonitrile, ethylene-propylene and silicone rubber.

9. A body as set forth in claim 5 wherein the vehicle comprises a watercraft.

10. A body as set forth in claim 9 wherein the protective layer is a thermosetting resin selected from the group consisting of epoxy, phenolic and urethane resins.

11. A body as set forth in claim 9 wherein the protective layer is a thermoplastic nylon resin.

12. A body as set forth in claim 9 wherein the protective layer is a synthetic rubber selected from the group consisting of butadiene-acrylonitrile, ethylene-propylene and silicone rubber.

13. A body as set forth in claim 9 wherein the watercraft comprises a jet propelled watercraft.

14. A body as set forth in claim 13 wherein the protective layer is a thermosetting resin selected from the group of epoxy, phenolic and urethane resins.

15. A body as set forth in claim 13 wherein the protective layer is a thermoplastic nylon resin.

16. A body as set forth in claim 13 wherein the protective layer is a synthetic rubber selected from the group consisting of butadiene-acrylonitrile, ethylene-propylene and silicone rubber.

* * * * *

UNITED STATES PATENT AND TRADEMARK OFFICE
CERTIFICATE OF CORRECTION

PATENT NO. : 5,122,419

DATED : June 16, 1992

INVENTOR(S) : Kurato, et al

It is certified that error appears in the above-identified patent and that said Letters Patent is hereby corrected as shown below:

Column 4, line 43, Claim 14, after "group" insert --consisting--.

Signed and Sealed this

Twenty-first Day of September, 1993

Attest:

BRUCE LEHMAN

Attesting Officer    Commissioner of Patents and Trademarks